(12) United States Patent
Kashiwaba

(10) Patent No.: US 7,903,347 B2
(45) Date of Patent: Mar. 8, 2011

(54) LENS APPARATUS AND OPTICAL APPARATUS

(75) Inventor: Seiichi Kashiwaba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 12/506,009

(22) Filed: Jul. 20, 2009

(65) Prior Publication Data
US 2010/0020414 A1 Jan. 28, 2010

(30) Foreign Application Priority Data
Jul. 28, 2008 (JP) ................................. 2008-194033

(51) Int. Cl.
G02B 15/14 (2006.01)

(52) U.S. Cl. ......... 359/700; 359/694; 359/699; 359/701; 359/704

(58) Field of Classification Search .......... 359/694–704, 359/823–826; 396/72–79, 83, 448; 348/208.5, 348/340
See application file for complete search history.

(56) References Cited

U.S. PATENT DOCUMENTS

| | | | | |
|---|---|---|---|---|
| 4,099,847 A | * | 7/1978 | Ito | 359/705 |
| 4,281,907 A | * | 8/1981 | Kamata | 359/700 |
| 4,324,457 A | * | 4/1982 | Tomori | 359/706 |
| 4,461,544 A | * | 7/1984 | Isobe et al. | 359/698 |
| 6,570,718 B2 | * | 5/2003 | Nomura et al. | 359/699 |
| 6,853,500 B2 | * | 2/2005 | Nomura et al. | 359/695 |
| 7,212,352 B2 | * | 5/2007 | Nomura et al. | 359/701 |
| 7,327,527 B2 | * | 2/2008 | Sakamoto et al. | 359/822 |

FOREIGN PATENT DOCUMENTS

JP 2001-100080 A 4/2001

* cited by examiner

*Primary Examiner* — Loha Ben
(74) *Attorney, Agent, or Firm* — Canon U.S.A., Inc. I.P. Division

(57) ABSTRACT

The lens apparatus includes a guide barrel including a guide groove portion penetrating through a circumferential wall of the guide barrel, and a cam barrel disposed rotatably and including a penetrating cam groove portion penetrating through a circumferential wall of the cam barrel and a non-penetrating cam groove portion not penetrating therethrough. The apparatus further includes a first holding member holding a first optical element and moved in an optical axis direction by the guide groove portion and the penetrating cam groove portion with rotation of the cam barrel, a second holding member holding a second optical element and moved in the optical axis direction by the guide groove portion and the non-penetrating cam groove portion with the rotation of the cam barrel, and an adjusting mechanism used for adjusting a position of one of the first and second optical elements relative to that of the other.

6 Claims, 2 Drawing Sheets

LENS APPARATUS AND OPTICAL APPARATUS

BACKGROUND OF THE INVENTION

The present invention relates to a lens apparatus which moves optical elements such as lenses in an optical axis direction by using a cam barrel.

Such lens apparatuses are often constituted by, as disclosed in Japanese Patent Laid-Open No. 2001-100080, a guide barrel including a guide groove (straight groove) portion extending in the optical axis direction and a cam barrel including plural cam groove portions. Rotation of the cam barrel moves plural optical elements (lenses) via cam followers engaging with the guide groove portion and the cam groove portions.

When forming plural cam groove portions on the cam barrel, using a same processing method for the plural cam groove portions (for example, forming all the cam groove portions so as to penetrate through a circumferential wall of the came barrel) can reduce processing errors, which makes it easy to improve positional accuracy of the optical elements moved by the cam groove portions.

However, forming on the cam barrel multiple cam groove portions having different cam groove shapes for simultaneously moving the optical elements makes distances between mutually adjacent cam groove portions narrow. In this case, if all the cam groove portions are formed so as to penetrate through the circumferential wall of the cam barrel, an external impact applied to the lens apparatus easily deforms the cam groove portions (or the cam barrel), which reduces the positional accuracy of the optical elements.

SUMMARY OF THE INVENTION

The present invention provides a lens apparatus which is strong against impacts while including plural cam groove portions formed on a cam barrel and which is capable of increasing positional accuracy of plural optical elements moved by the plural cam groove portions in an optical axis direction, and provides an optical apparatus including the lens apparatus.

The present invention provides as an aspect thereof a lens apparatus that includes a guide barrel including a guide groove portion formed on a circumferential wall of the guide barrel so as to penetrate therethrough, a cam barrel disposed rotatably in a circumferential direction thereof and including a penetrating cam groove portion formed on a circumferential wall of the cam barrel so as to penetrate therethrough and a non-penetrating cam groove portion formed on the circumferential wall of the cam barrel so as not to penetrate therethrough, a first holding member holding a first optical element and moved in an optical axis direction of the lens apparatus by the guide groove portion and the penetrating cam groove portion with rotation of the cam barrel, a second holding member holding a second optical element and moved in the optical axis direction by the guide groove portion and the non-penetrating cam groove portion with the rotation of the cam barrel, and an adjusting mechanism used for adjusting a position of one of the first and second optical elements relative to that of the other.

The present invention provides as another aspect thereof an optical apparatus including the above-described lens apparatus.

Other aspects of the present invention will become apparent from the following description and the attached drawings.

DESCRIPTION OF THE EMBODIMENTS

Exemplary embodiments of the present invention will be described hereinafter with reference to the accompanying drawings.

Figure 1:
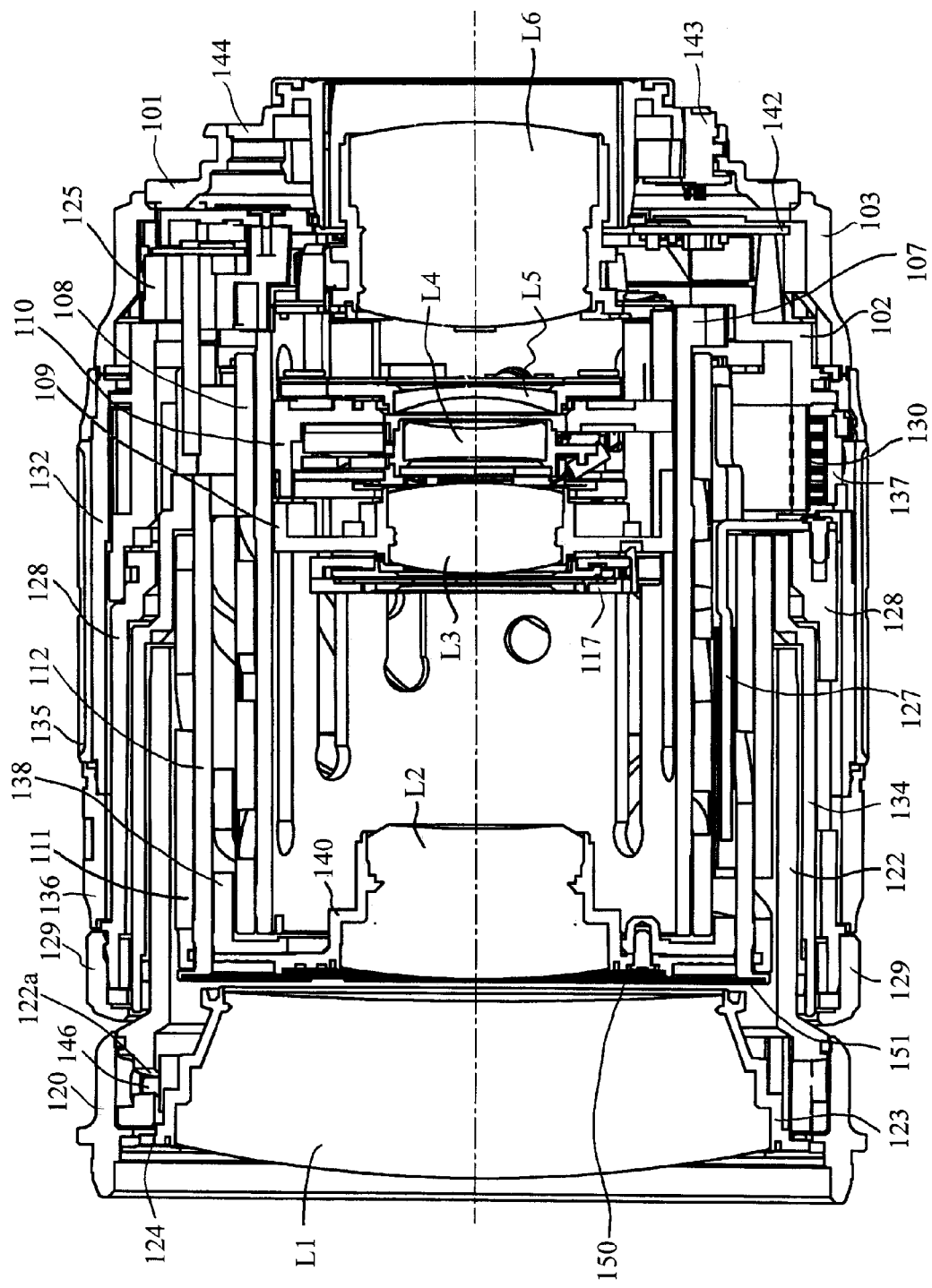
FIG. 1 is a cross sectional view showing a configuration of an interchangeable lens that is Embodiment 1 of the present invention.
Figure 2:
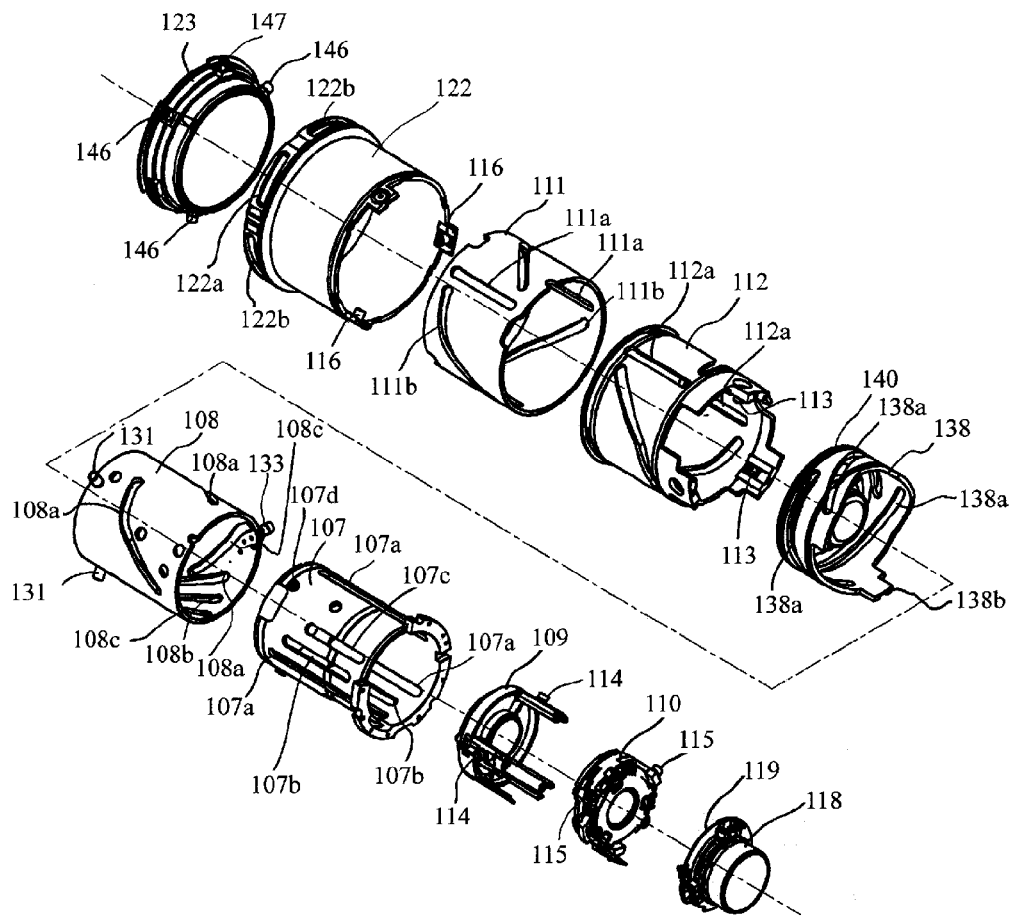
FIG. 2 is an exploded perspective view of a main part of the interchangeable lens.
Figure 3:
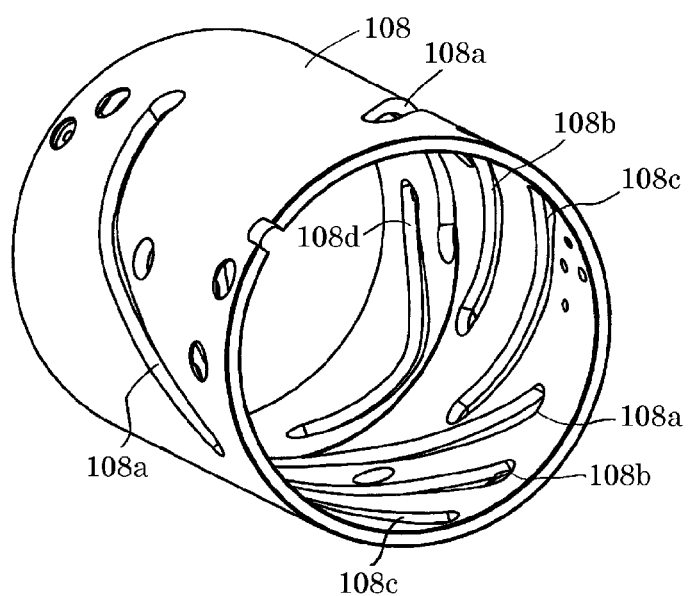
FIG. 3 is a perspective view of a cam barrel used in the interchangeable lens.

FIGS. 1 to 3 show an internal configuration of an interchangeable lens (lens apparatus) for a single lens reflex camera (hereinafter referred to as "camera body"), the interchangeable lens being an embodiment of the present invention.

FIG. 1 shows a section of the interchangeable lens. FIG. 2 shows an exploded view of an optical system holding part provided in the interchangeable lens. FIG. 3 shows a cam barrel A108 used in the interchangeable lens.

The interchangeable lens of this embodiment contains an optical system constituted by six lens units including first to sixth lens units L1 to L6 arranged in order from an object side. In this interchangeable lens, all the six lens units L1 to L6 are moved in a direction of an optical axis (hereinafter referred to as "optical axis direction") in a zoom operation, and the second lens unit L2 is moved in the optical axis direction in a focus operation.

In the zoom operation, the third lens unit L3 and the sixth lens unit L6 are integrally moved in the optical axis direction, and the fourth lens unit L4 and the fifth lens unit L5 are integrally moved in the optical axis direction. The fourth lens unit L4 is moved (shifted) in a direction orthogonal to the optical axis to perform an image shake correction operation (image stabilization operation), in addition to the movement in the optical axis direction in the zoom operation.

Reference numeral 101 denotes a mount including a bayonet structure for mounting the interchangeable lens to the camera body. The mount 101 is fixed to a fixed barrel 102 by screws.

Reference numeral 103 denotes an exterior ring fixed by being disposed between the mount 101 and the fixed barrel 102. On the exterior ring 103, a switch panel (not shown) is attached. Operations of switches provided on the switch panel enable selective use of functions such as auto focus and image stabilization.

Reference numeral 107 denotes a guide barrel which is fixed to the fixed barrel 102 to form a fixed part with respect to the camera body. The guide barrel 107 includes guide groove portions 107a, 107b and 107c formed on a circumferential wall of the guide barrel 107 so as to extend in the optical axis direction. The guide groove portions 107a, 107b and 107c are formed so as to penetrate through the circumferential wall of the guide barrel 107 from its outer circumferential surface to its inner circumferential surface.

At an outer circumference of the guide barrel 107, the cam barrel A108 is disposed rotatably around the optical axis and movably in the optical axis direction relative to the guide barrel 107.

The cam barrel A108 includes cam groove portions (hereinafter referred to as "penetrating cam groove portions") 108a formed on a circumferential wall of the cam barrel A108 so as to penetrate therethrough from its outer circumferential surface to its inner circumferential surface. Further, the cam barrel A108 also includes cam groove portions (non-penetrating cam groove portions) 108b and 108c formed on an inner circumferential surface of the circumferential wall of the cam barrel A108 so as not to penetrate therethrough. The cam groove portions 108b and 108c are hereinafter referred to as "inner circumferential cam groove portions".

In the following description, the wording "formed on the inner circumferential surface of the circumferential wall so as not to penetrate therethrough (through the circumferential wall)" is substituted with wording "formed only on the inner surface of the circumferential wall".

The cam barrel A108 further includes a cam-barrel-moving cam groove portion 108d formed only on the inner surface of the circumferential wall as with the inner circumferential cam groove portions 108b and 108c.

The cam barrel A108 is rotated around the optical axis and moved in the optical axis direction relative to the guide barrel 107 by engagement of a follower 107d fixed to the guide barrel 107 with a screw and the cam-barrel-moving cam groove portion 108d.

Cam followers 113 provided on an inner circumferential surface of a straight-proceeding barrel A112, which will be described later, engage with the penetrating cam groove portions 108a and the guide groove portions 107a. Further, cam followers 114 provided on an outer circumferential surface of a third holding frame (lens holding member) 109 holding the third lens unit L3 engage with the guide groove portions 107b and the inner circumferential cam groove portions 108b. Moreover, cam followers 115 provided on an outer circumferential surface of an image stabilizing unit 110, which will be described later, engage with the guide groove portions 107c and the inner circumferential cam groove portions 108c.

Rotation of the cam barrel A108 moves intersections of the guide groove portions 107a, 107b and 107c formed on the guide barrel 107 and the cam groove portions 108a, 108b and 108c formed on the cam barrel A108 in the optical axis direction. Therefore, the straight-proceeding barrel A112 whose cam followers 113 engage with the guide groove portions 107a and the penetrating cam groove portions 108a is moved in the optical axis direction via the cam followers 113 by cam lifts of the penetrating cam groove portions 108a while being guided in the optical axis direction by the guide groove portions 107a. The guide of the straight-proceeding barrel A112 in the optical axis direction by the guide groove portions 107a prevents the straight-proceeding barrel A112 from rotating around the optical axis.

The guide of the third holding frame 109 and the image stabilizing unit 110 in the optical axis direction by the guide groove portions 107b and 107c also prevents the third holding frame 109 and the image stabilizing unit 110 from rotating around the optical axis.

The third holding frame 109 whose cam followers 114 engage with the guide groove portions 107b and the inner circumferential cam groove portions 108b is moved in the optical axis direction via the cam followers 114 by cam lifts of the inner circumferential cam groove portions 108b while being guided in the optical axis direction by the guide groove portions 107b. The image stabilizing unit 110 whose cam followers 115 engage with the guide groove portions 107c and the inner circumferential cam groove portions 108c is moved in the optical axis direction via the cam followers 115 by cam lifts of the inner circumferential cam groove portions 108c while being guided in the optical axis direction by the guide groove portions 107c.

The third holding frame 109 is disposed at an inner circumference of the guide barrel 107. An electromagnetic diaphragm unit 117 constituted by a diaphragm driving part and plural diaphragm blades is fixed to the third holding frame 109 by screws.

A sixth holding frame 118 holding the sixth lens unit L6 is fixed to a rear end of the third holding frame 109 with a reinforcement plate 119 by screws with spring washers.

The image stabilizing unit 110 is disposed at the inner circumference of the guide barrel 107 and holds the fourth lens unit L4 such that the fourth lens unit L4 is shiftable in the direction orthogonal to the optical axis. Electromagnetic actuators provided in the image stabilizing unit 110 each constituted by a magnet and a coil cause the fourth lens unit L4 to shift in two (pitch and yaw) directions included in the direction orthogonal to the optical axis. The image stabilizing unit 110 also holds the fifth lens unit L5.

The straight-proceeding barrel A112 is disposed at an outer circumference of the cam barrel A108 and includes guide groove portions 112a extending in the optical axis direction.

Reference numeral 111 denotes a cam barrel B disposed at an outer circumference of the straight-proceeding barrel A112. The cam barrel B111 is connected to the straight-proceeding barrel A112 by bayonet coupling so as to be rotatable around the optical axis but so as not to be movable in the optical axis. Followers 131 fixed to the cam barrel A108 by screws engage with guide groove portions 111a formed on the cam barrel B111 so as to extend in the optical axis direction, which makes the cam barrel B111 movable in the optical axis direction but not rotatable around the optical axis. Thus, the cam barrel B111 is moved in the optical axis direction integrally with the straight-proceeding barrel A112, and is rotated around the optical axis integrally with the cam barrel A108.

Reference numeral 122 denotes a straight-proceeding barrel B which is disposed at an outer circumference of the cam barrel B111. Cam followers 116 are fixed to the straight-proceeding barrel B122 by screws. Cam groove portions 122a each forming a slight angle (that is, inclining slightly) with respect to a circumferential direction of the straight-proceeding barrel B122 are formed on the straight-proceeding barrel B122.

The cam followers 116 engage with the guide groove portions 112a formed on the straight-proceeding barrel A112 so as to extend in the optical axis direction and cam groove portions 111b formed on the cam barrel B111. Rotation of the cam barrel B111 moves intersections of the guide groove portions 112a and the cam groove portions 111b, and thereby the straight-proceeding barrel B122 is moved in the optical axis direction with respect to the straight-proceeding barrel A112.

Reference numeral 123 denotes a first lens holding frame holding the first lens unit L1. Followers 146 engaging with the cam groove portions 122a formed on the straight-proceeding barrel B122 are attached to the first lens holding frame 123.

The first to sixth lens units L1 to L6, the image stabilizing unit 110 and the electromagnetic diaphragm unit 117 are optical elements. The first lens unit L1 (the first holding frame 123) corresponds to a first optical element, and the third lens unit L3 (the third holding frame 109) and the image stabilizing unit 110 correspond to second optical elements.

The first holding frame 123 is moved by the following movement amount in the optical axis direction with respect to the cam barrel A108 by the rotation of the cam barrels A108 and B111. The movement amount of the first holding frame 123 in the optical axis direction is determined based on a combined movement amount of a movement amount of the straight-proceeding barrel A112 and the cam barrel B111 by the penetrating cam groove portions 108a formed on the cam barrel A108 and that of the straight-proceeding barrel B122 with respect to the straight-proceeding barrel A112 by the cam groove portions 111b formed on the cam barrel B111. The cam barrel A108 itself is also moved in the optical axis direction with respect to the guide barrel 107 by the cam-barrel-moving cam groove portion 108d. Therefore, the first holding frame 123 is moved with respect to the guide barrel 107 by a total movement amount that is a sum of the movement amount of the cam barrel A108 and the above-described combined movement amount.

Each of the followers 146 has an attachment shaft portion which is rotatably attached to the first holding frame 123, and an eccentric shaft portion which is eccentric to the attachment shaft portion and engages with the cam groove portion 122a of the straight-proceeding barrel B122. As described later, selecting a combination of rotational positions of the eccentric shaft portions of the followers 146 attached to three places in a circumferential direction of the first holding frame 123 can adjust (arbitrary set) a tilt of the first holding frame 123 with respect to the straight-proceeding barrel B122, that is, with respect to the optical axis direction.

The adjustment of the tilt of the first holding frame 123 with respect to the optical axis direction and adjustment of a position of the first holding frame 123 in the optical axis direction are performed according to the following procedure. In the following description, these adjustments of the tilt and position are hereinafter collectively referred to as "position adjustments".

The first holding frame 123 before the followers 146 are attached is first inserted into an inner circumference of the straight-proceeding barrel B122. Next, the three followers 146 are inserted into the cam groove portions 122a formed in three circumferential areas of the straight-proceeding barrel B122 from its outer circumferential surface side so as to penetrate through the cam groove portions 122a, and then the attachment shafts of the followers 146 are attached to the first holding frame 123. This enables the straight-proceeding barrel B122 to hold the first holding frame 123 so as to prevent the first holding frame 123 from falling off.

In this state, the eccentric shaft portions of the three followers 146 are rotated (in other words, the combination of the rotational positions of the eccentric shaft portions is selected) to arbitrary set the tilt of the first holding frame 123 with respect to the straight-proceeding barrel B122.

Next, the first holding frame 123 is rotated around the optical axis with respect to the straight-proceeding barrel B122 to change engagement positions of the followers 146 (eccentric shaft portions) with the cam groove portions 122a, thereby moving the first holding frame 123 in the optical axis direction relative to the straight-proceeding barrel B122. This can adjust the position of the first holding frame 123 in the optical axis direction such that focus is on an image pickup plane.

Thus, the interchangeable lens of this embodiment is provided with, as "an adjusting mechanism used for adjusting a position of one of the first and second optical elements relative to that of the other", the mechanism (hereinafter referred to as "position adjusting mechanism") for adjusting the position and the tilt of the first lens unit L1 (first holding frame 123) relative to those of the other optical elements. The first lens unit L1 that is the "one of the first and second optical elements" is an optical element moved by the penetrating cam groove portions 108a whose number is smaller than that of the inner circumferential cam groove portions 108b and 108c.

After the above-described position adjustments, screw sheets 122b formed in three circumferential areas of the straight-proceeding barrel B122 are tightened by head portions of three screws 147 attached to three circumferential places of the first holding frame 123. Thereby, the first holding frame 123 is prevented from rotating around the optical axis with respect to the straight-proceeding barrel B122.

In FIG. 1, reference numeral 120 denotes a filter frame fixed to an outer circumferential surface of the straight-proceeding barrel B122 with screws. The filter frame 120 is provided with a bayonet portion on its outer circumferential surface and provided with a screw portion on its inner circumferential surface. The bayonet portion is used for mounting a hood, and the screw portion is used for mounting an accessory such as a filter.

Reference numeral 124 denotes a decorative ring attached to a front surface of the first holding frame 123. Information such as a name of the interchangeable lens is printed on a front surface of the decorative ring 124.

Reference numeral 125 denotes a focus driving unit which is held by the fixed barrel 102. The focus driving unit 125 includes an actuator and a gear train (not shown). Rotation of the actuator is decelerated by the gear train and then output to a focus ring 128 via an output gear (not shown).

The focus ring 128 is bayonet-coupled with the fixed barrel 102 to be held thereby so as to be rotatable around the optical axis but so as not to be movable in the optical axis direction. The focus ring 128 has a gear portion (not shown) to which the rotation from the output gear of the focus driving unit 125 is transmitted.

Moreover, a knurled ring 129 forming an operating part for manual focus is attached to a front end of an outer circumferential surface of the focus ring 128. In addition, a focus key 127 is fixed to a rear end of the focus ring 128. The rotational output from the focus driving unit 125 rotates the focus key 127 around the optical axis via the focus ring 128.

Reference numeral 132 denotes a zoom operation ring which is bayonet-coupled with the fixed barrel 102 to be held thereby so as to be rotatable around the optical axis but so as not to be movable in the optical axis direction. The zoom operation ring 132 is provided with a guide groove portion (not shown) which extends in the optical axis direction and with which a zoom key 133 (see FIG. 2) fixed to the cam barrel A108 with a screw engages. Rotating the zoom operation ring 132 can rotate the cam barrel A108 (and the cam barrel B111) integrally with the zoom operation ring 132 around the optical axis.

Reference numeral 137 denotes a zoom brush which is fixed to the zoom operation ring 132 with a screw. The zoom brush 137 slides on a gray code pattern formed on an encoder flexible substrate 130 attached on an outer circumferential surface of the fixed barrel 102 with the rotation of the zoom operation ring 132. A rotational position of the zoom operation ring 132 (that is, a zoom position) can be detected by using an output signal from the encoder flexible substrate 130.

On an outer circumferential surface of the zoom operation ring 132, a zoom rubber ring 135 is attached to prevent a user's hand operating the zoom operation ring 132 from slipping. Further, a name ring 136 is attached at a front end of the zoom operation ring 132.

Reference numeral 134 denotes an intermediate barrel which is fixed to the straight-proceeding barrel A112 by screws to be moved integrally with the straight-proceeding barrel A112.

Reference numeral 138 denotes a focus cam barrel disposed at the inner circumference of the straight-proceeding barrel A112. The focus cam barrel 138 is provided with focus cam groove portions 138a with which the followers 131 fixed to the cam barrel A108 engage. Moreover, the focus cam barrel 138 is provided with a key portion 138b which extends rearward in the optical axis direction as shown in FIG. 2 and engages with the focus key 127. The rotation of the focus key 127 rotates the focus cam barrel 138 around the optical axis.

Reference numeral 140 denotes a second holding frame which holds the second lens unit L2 and is fixed to the focus cam barrel 138.

In a state where the focus key 127 is stopped, the rotation of the cam barrel A108 moves the second holding frame 140 in the optical axis direction by a combined movement amount of a movement amount of the cam barrel A108 relative to the guide barrel 107 and that of engagement positions of the followers 131 and the focus cam groove portions 138a.

On the other hand, in a state where the cam barrel A108 is stopped, the rotation of the focus key 127 moves the second holding frame 140 in the optical axis direction while rotating according to a change amount of the engagement positions of the followers 131 and the focus cam groove portions 138a in the optical axis direction.

This embodiment uses such a mechanism for the interchangeable lens which is an inner focus type lens to move the second lens unit L2 in the optical axis direction in order to mechanically correct shift of an image plane position caused by change of a focal length of the interchangeable lens.

Reference numeral 142 denotes a main substrate to which the focus driving unit 125, the electromagnetic diaphragm unit 117, the image stabilizing unit 110, the encoder flexible substrate 130 and the like are electrically connected through flexible substrates. A CPU (not shown) mounted on the main substrate 142 detects the zoom position on the basis of the output signal from the encoder flexible substrate 130 and controls operations of the focus driving unit 125, the electromagnetic diaphragm unit 117 and image stabilizing unit 110.

Reference numeral 143 denotes a contact block which is fixed to the mount 101 with screws. The CPU on the main substrate 142 can communicate with the camera body through the contact block 143. Moreover, the interchangeable lens (the main substrate 142 and the like) receives power from the camera body through the contact block 143.

Reference numeral 144 denotes a back lid which elastically engages with the mount 101 to be fixed thereto. Reference numeral 150 denotes a light-shielding plate attached on a front portion of the second holding frame 140. Reference numeral 151 denotes a light-shielding plate attached on a front end of the straight-proceeding barrel A112. These light-shielding plates 150 and 151 cut unnecessary light for image pickup.

In the interchangeable lens configured as described above, a rotational operation of the zoom operation ring 132 rotates the cam barrel A108 through the zoom key 133, and thereby all the lens units L1 to L6 are moved in the optical axis direction to perform zooming.

On the other hand, in the auto focus, the rotational output from the focus driving unit 125 rotates the focus ring 128 and the focus key 127, and thereby the second holding frame 140 (second lens unit L2) is moved in the optical axis direction through the above-described mechanism. In the manual focus, rotation of the knurled ring 129 (focus ring 128) moves the second holding frame 140 (second lens unit L2) in the optical axis direction through the focus key 127 and the above-described mechanism.

In the image stabilization operation, the image stabilizing unit 110 is controlled such that the fourth lens unit L4 is shifted in the pitch and yaw directions orthogonal to the optical axis according to an output of a shake sensor (not shown) such as an angular velocity sensor or an acceleration sensor and the output from the encoder flexible substrate 130. The fourth lens unit L4 is shifted in a direction canceling out a movement of an image on the image pickup plane caused due to shake occurring on the interchangeable lens.

In the interchangeable lens of this embodiment described above, on the circumferential wall of the cam barrel A108, the penetrating cam groove portions 108a penetrating through the circumferential wall from its outer circumferential surface to its inner circumferential surface and the inner circumferential cam groove portions (non-penetrating cam groove portions) 108b and 108c formed only on the inner circumferential surface are formed together. This can make deformation of the cam groove portions 108a to 108c or the cam barrel A108 due to external impacts hard to occur regardless of mutually adjacent arrangement of the cam groove portions 108a to 108c in the optical axis direction.

Moreover, in this embodiment, the cam barrel A108 is disposed at the outer circumference of the guide barrel 107, and the third holding frame 109 and the image stabilizing unit 110 are moved in the optical axis direction by the inner circumferential cam groove portions 108b and 108c of the cam barrel A108 at the inner circumference of the guide barrel 107. In addition, at the outer circumference of the guide barrel 107, the straight-proceeding barrel A112 that moves the first holding frame 123 in the optical axis direction via the cam barrel B111 and the straight-proceeding barrel B122 is moved in the optical axis direction by the penetrating cam groove portions 108a of the cam barrel A108. Specifically, the penetrating cam groove portion 108a generates part of the combined movement amount of the first holding frame 123 in the optical axis direction. This can achieve a lens driving mechanism with good efficiency which simultaneously moves multiple optical elements using cam groove portions having mutually different shapes (that is, providing different movement amounts) formed on one cam barrel A108.

Furthermore, in this embodiment, the first holding frame 123 moved in the optical axis direction by the penetrating cam groove portions 108a of the cam barrel A108 via the straight-proceeding barrel A112, the cam barrel B111 and the straight-proceeding barrel B122 can adjust its position and tilt with respect to the straight-proceeding barrel B122 (that is, the position adjustments of the first holding frame 123 can be made). This makes it possible to correct relative positional shift of the first holding frame 123, the third holding frame 109 and the image stabilizing unit 110 caused due to processing errors of the penetrating cam groove portions 108a and the inner circumferential cam groove portions 108b and 108c formed by mutually different processing methods. Thus, good positional accuracy of each optical element can be ensured.

In addition, this embodiment includes one optical element (the first holding frame 123) which is moved by the penetrating cam groove portions 108a of the cam barrel A108 and two optical elements (the third holding frame 109 and the image stabilizing unit 110) which are moved by the inner circumferential cam groove portions 108b and 108c of the cam barrel A108. Further, the position adjusting mechanism is provided for the first holding frame 123 which is moved by the penetrating cam groove portions 108a whose number is smaller than that of the inner circumferential cam groove portions 108b and 108c. This makes it possible to correct, by position adjusting work at a small number of places (for example, one place), the relative positional shift of the optical elements caused due to the processing errors of the penetrating cam groove portions 108a and the inner circumferential cam groove portions 108b and 108c formed by mutually different processing methods.

Moreover, in this embodiment, the cam-barrel-moving cam groove portion 108d is formed only on the inner circumferential surface of the circumferential wall of the cam barrel A108, as with the inner circumferential cam groove portions 108b and 108c respectively moving the third holding frame 109 and the image stabilizing unit 110. In other words, the cam-barrel-moving cam groove portion 108d is a cam groove portion different from the cam groove portion moving the first holding frame 123 provided with the position adjusting mechanism, among the penetrating cam groove portions 108a and the inner circumferential cam groove portions 108b and 108c.

In further other words, the position adjusting mechanism is provided for the first holding frame 123 moved by the cam groove portions (penetrating cam groove portions 108a) whose number is smaller than that of the other cam groove portions, among the cam groove portions penetrating through the circumferential wall of the cam barrel A108 and the cam groove portions formed only on the inner circumferential surface of the circumferential wall of the cam barrel A108 including the cam-barrel-moving cam groove portion 108d.

This configuration can ensure positional accuracy (movement accuracy) of each of the third holding frame 109 and the image stabilizing unit 110 which are moved relative to the guide barrel 107 by the cam groove portions 108b to 108d formed by a same processing method (in other words, having little accuracy difference). Moreover, this configuration makes it possible to correct, by position adjusting work at a small number of places (one place in this embodiment), relative positional shift of the optical elements caused due to processing errors of the cam groove portions 108a to 108d formed by mutually different processing methods.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, the above embodiment described the case where the number of the inner circumferential cam groove portions formed on the cam barrel is larger than that of the penetrating cam groove portions and the position adjusting mechanism is provided for the optical element moved by the penetrating cam groove portions. However, the number of the inner circumferential cam groove portion(s) formed on the cam barrel may be smaller than that of the penetrating cam groove portions, and the position adjusting mechanism may be provided for an optical element(s) moved by the inner circumferential cam groove portion(s). In this case, it is desirable to move, by same type cam groove portions formed by a same processing method, optical elements whose relative positional shift causes a significant deterioration of optical performance.

Moreover, the above embodiment described the case where the position adjusting mechanism of the optical element is a mechanism for adjusting the position thereof in the optical axis direction. However, a position adjusting mechanism may be a mechanism for adjusting a position of the optical element in the direction orthogonal to the optical axis.

Furthermore, the above embodiment described the case where the position adjusting mechanism is provided for the first holding frame 123. However, a position adjusting mechanism may be provided which is capable of adjusting a position of the straight-proceeding barrel A112 or B122 by using an eccentric follower. In addition, the number of the position adjusting mechanism is not limited to one as shown in the above embodiment, an adequate number of the position adjusting mechanisms such as a mechanism for adjusting a relative positional relationship of the fourth and fifth lens units L4 and L5 included in the image stabilizing unit 110 may be provided for obtaining good optical performance.

Moreover, the above embodiment described the case where the cam barrel A108 itself is moved relative to the guide barrel 107 in the optical axis direction. However, it is only necessary that the cam barrel is rotated around the optical axis relative to the guide barrel 107, that is, it is not necessary that the cam barrel is moved in the optical axis direction.

Further, the above embodiment described the case where, on the cam barrel A108, the number of the penetrating cam groove portions 108a and that of the inner circumferential cam groove portions 108b and 108c are mutually different. However, these numbers may be the same. It is only necessary to form at least one penetrating cam groove portion and at least one inner circumferential cam groove portion on the cam barrel and to provide at least one first optical element and at least one second optical element respectively moved by the penetrating cam groove portion and the inner circumferential cam groove portion.

Moreover, the above embodiment described the interchangeable lens. However, the present invention can be applied to a lens apparatus used in various optical apparatuses such as a lens-integrated lens shutter camera, a digital still camera and a video camera.

This application claims the benefit of Japanese Patent Application No. 2008-194033, filed on 28 Jul. 2008, which is hereby incorporated by reference herein in its entirety.

What is claimed is:

1. A lens apparatus comprising:
   a guide barrel including a guide groove portion formed on a circumferential wall of the guide barrel so as to penetrate therethrough;
   a cam barrel disposed rotatably in a circumferential direction thereof and including a penetrating cam groove portion formed on a circumferential wall of the cam barrel so as to penetrate therethrough and a non-penetrating cam groove portion formed on the circumferential wall of the cam barrel so as not to penetrate therethrough,
   a first holding member holding a first optical element and being moved in an optical axis direction of the lens apparatus by the guide groove portion and the penetrating cam groove portion with rotation of the cam barrel;
   a second holding member holding a second optical element and being moved in the optical axis direction by the guide groove portion and the non-penetrating cam groove portion with the rotation of the cam barrel; and
   an adjusting mechanism used for adjusting a position of one of the first and second optical elements relative to that of the other.

2. The lens apparatus according to claim 1,
   wherein the penetrating and non-penetrating cam groove portions are formed in different numbers, and
   wherein the one of the first and second optical elements is moved in the optical axis direction by one of the penetrating and non-penetrating cam groove portions whose number is smaller than that of the other.

3. The lens apparatus according to claim 1,
   wherein the cam barrel includes a cam-barrel-moving cam groove portion which is formed as one of the penetrating cam groove portions or one of the non-penetrating cam groove portions and which engages with a cam follower provided on the guide barrel to move the cam barrel, and wherein the one of the first and second optical elements is moved in the optical axis direction by one of the penetrating and non-penetrating cam groove portions whose number is smaller than that of the other.

4. The lens apparatus according to claim 1,
wherein the cam barrel includes a cam-barrel-moving cam groove portion which is formed as one of the penetrating cam groove portions or one of the non-penetrating cam groove portions and which engages with a cam follower provided on the guide barrel to move the cam barrel, and wherein the cam-barrel-moving cam groove portion is a cam groove portion different from the cam groove portion moving the one of the first and second optical elements in the optical axis direction.

5. The lens apparatus according to claim 1,
wherein the cam barrel is rotatably disposed at an outer circumference of the guide barrel, and the non-penetrating cam groove portion is formed on an inner circumferential surface of the cam barrel, and wherein the first holding member is disposed at an outer circumference of the cam barrel, and the second holding member is disposed at an inner circumference of the cam barrel.

6. An optical apparatus comprising:
the lens apparatus according to claim 1.

* * * * *